United States Patent [19]

Powell et al.

[11] Patent Number: 5,585,725
[45] Date of Patent: Dec. 17, 1996

[54] MAGNETIC DETECTION OF UNDERGROUND PIPE USING TIMED-RELEASE MARKING DROPLETS

[75] Inventors: James R. Powell, Shoreham; Morris Reich, Kew Garden Hills, both of N.Y.

[73] Assignee: Associated Universities, Inc., Washington, D.C.

[21] Appl. No.: 421,567

[22] Filed: Apr. 13, 1995

[51] Int. Cl.⁶ ............... G01V 3/08; G01V 3/165; F16L 1/11; H01F 1/00
[52] U.S. Cl. ............... 324/326; 252/62.51 R; 324/345; 405/157
[58] Field of Search ............... 324/67, 326, 345, 324/207.26, 214–216; 252/62.51, 62.52, 62.53; 128/654; 405/154, 157, 160, 175, 176

[56] References Cited

U.S. PATENT DOCUMENTS

| | | | |
|---|---|---|---|
| 2,971,916 | 2/1961 | Schleicher et al. | 324/214 X |
| 4,131,064 | 12/1978 | Ryan et al. | 324/214 X |
| 4,573,016 | 2/1986 | Nakamura et al. | 324/326 |
| 4,641,566 | 2/1987 | Pomeroy | 89/1.13 |
| 4,674,480 | 6/1987 | Lemelson . | |
| 4,712,094 | 12/1987 | Bolson, Sr. | 340/572 |
| 4,767,237 | 8/1988 | Cosman et al. | 405/157 |
| 5,051,034 | 9/1991 | Goodman | 405/157 |
| 5,116,654 | 5/1992 | Cosman et al. | 428/77 |
| 5,122,750 | 6/1992 | Rippingale et al. | 324/326 |
| 5,150,056 | 9/1992 | Wilcock | 324/326 |
| 5,373,235 | 12/1994 | Clark, Jr. et al. | 324/229 X |

FOREIGN PATENT DOCUMENTS

| | | | |
|---|---|---|---|
| 0169758 | 9/1985 | Japan | 324/216 |
| 0170073 | 6/1990 | Japan | 324/214 |

*Primary Examiner*—Gerard R. Strecker
*Attorney, Agent, or Firm*—Margaret C. Bogosian

[57] ABSTRACT

A system 10 and method of detecting an underground pipe 12 injects magnetic marking droplets 16 into the underground pipe 12 which coat the inside of the pipe 12 and may be detected from aboveground by a magnetometer 28. The droplets 16 include a non-adhesive cover 32 which allows free flow thereof through the pipe 12, with the cover 32 being ablatable for the timed-release of a central core 30 containing magnetic particles 30a which adhere to the inside of the pipe 12 and are detectable from aboveground. The rate of ablation of the droplet covers 32 is selectively variable to control a free flowing incubation zone 12a for the droplets 16 and a subsequent deposition zone 12b in which the magnetic particles 30a are released for coating the pipe 12.

32 Claims, 5 Drawing Sheets

MAGNETIC DETECTION OF UNDERGROUND PIPE USING TIMED-RELEASE MARKING DROPLETS

This invention was made with Government support under contract number DE-AC02-76CH00016, between the U.S. Department of Energy and Associated Universities, Inc. The Government has certain rights in the invention.

The present invention relates generally to detecting and locating underground pipes, and, more specifically, to detecting non-metallic pipes.

BACKGROUND OF THE INVENTION

In some utility piping networks, the location of the pipes is mapped during the underground installation thereof so that they may be easily located and unearthed as required at subsequent times. Underground pipes may alternatively be located by using a conventional magnetometer moved along the surface of the ground for detecting changes in magnetic fields caused by ferrous pipes.

Some pipes are non-ferrous or non-metallic, such as plastic pipes, which cannot be magnetically detected when installed underground. To resolve this problem, various techniques are known for magnetically marking such pipes by imbedding magnetic particles therein during the manufacturing process thereof, or by using magnetic marking tapes which are buried in the ground along with the pipe for the subsequent magnetic detection thereof. Acoustic tomography and ground penetrating radar could also, in principal, be used for detecting underground plastic pipes, but background noise would make it difficult for accurately locating the buried pipes. These methods also require highly trained operators and would be relatively slow, labor intensive, and expensive.

SUMMARY OF THE INVENTION

A system and method of detecting an underground pipe injects magnetic marking droplets into the underground pipe which coat the inside of the pipe and may be detected from aboveground by a magnetometer. The droplets include a non-adhesive cover which allows free flow thereof through the pipe, with the cover being ablatable for the timed-release of a central core containing magnetic particles which adhere to the inside of the pipe and are detectable from aboveground. The rate of ablation of the droplet covers is selectively variable to control a free flowing incubation zone for the droplets and a subsequent deposition zone in which the magnetic particles are released for coating the pipe.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
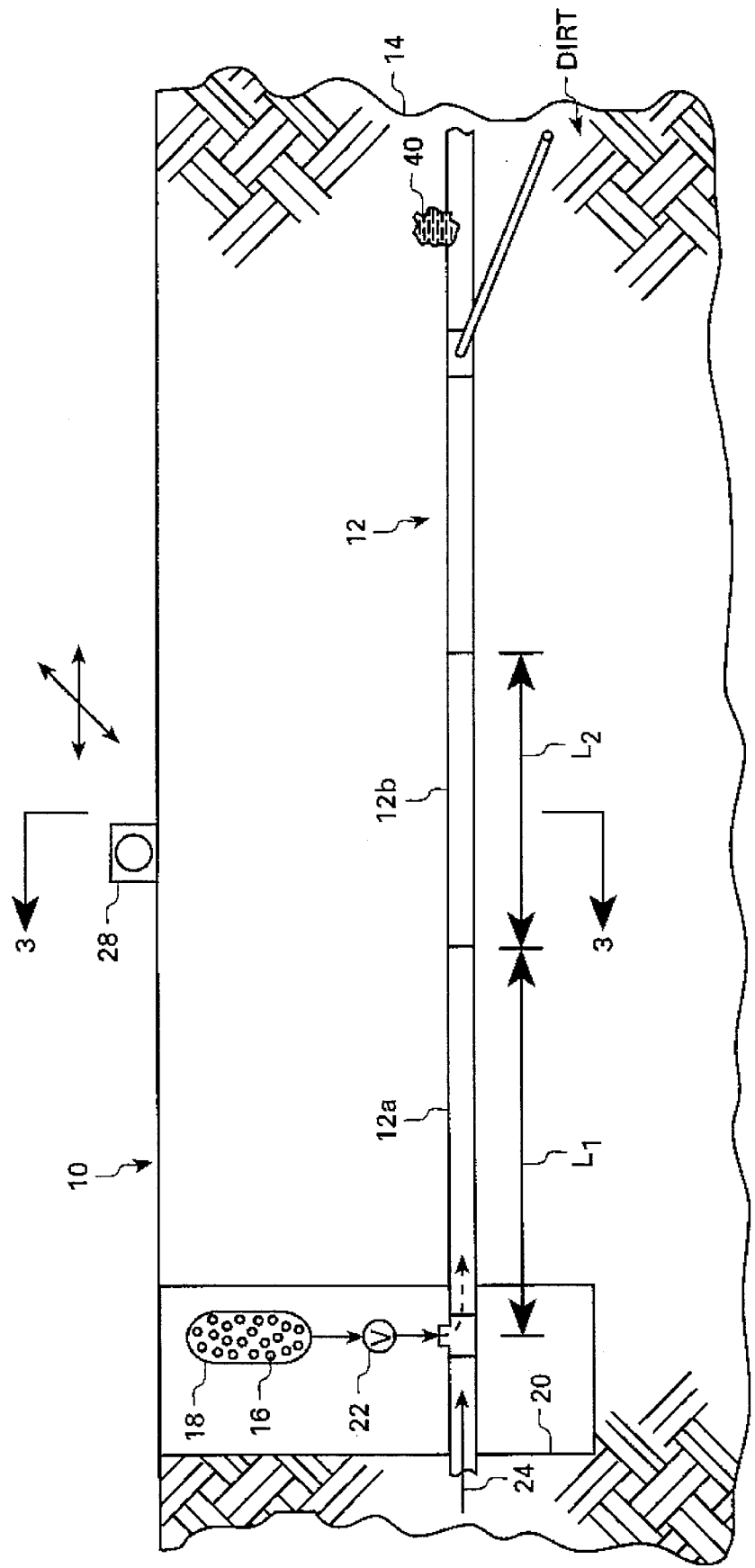
FIG. 1 is a schematic, elevational sectional view of a system for magnetically detecting an underground pipe in accordance with one embodiment of the present invention.

Illustrated schematically in FIG. 1 is a system 10 for detecting or locating an underground pipe 12 of a utility piping network, for example, which is buried below the surface of the ground or earth 14. In the exemplary embodiment illustrated, the pipe 12 is non-metallic, such as plastic, and is therefore not detectable by conventional electric or magnetic methods. In accordance with the present invention, the location of the pipe 12 may be magnetically detected by the system 10 by injecting into the pipe 12 magnetic tagging or marking droplets 16, initially stored in a pressurized first container 18, to selectively coat the inside surface or wall of the pipe 12 downstream from the injection site, and then magnetically detecting from above the ground 14 the magnetic marking droplets 16 coating the inside of the pipe 12. The Magnetic Injection and Detection of Underground piping Networks may be referred to herein by the acronym MAIDUN.

In the exemplary embodiment illustrated in FIG. 1, access to a portion of the pipe 12 is provided by a conventional manhole 20 in which the droplet container 18 may be disposed. The container 18 is operatively joined in flow communication to the pipe 12 by a first or droplet control valve 22 which allows the droplets 16 to be selectively injected under pressure into the pipe 12. In this exemplary embodiment, the pipe 12 carries a main fluid 24 flowing therethrough, with the droplets 16 being injectable into the main fluid 24 for flow downstream therewith.

Figure 2:
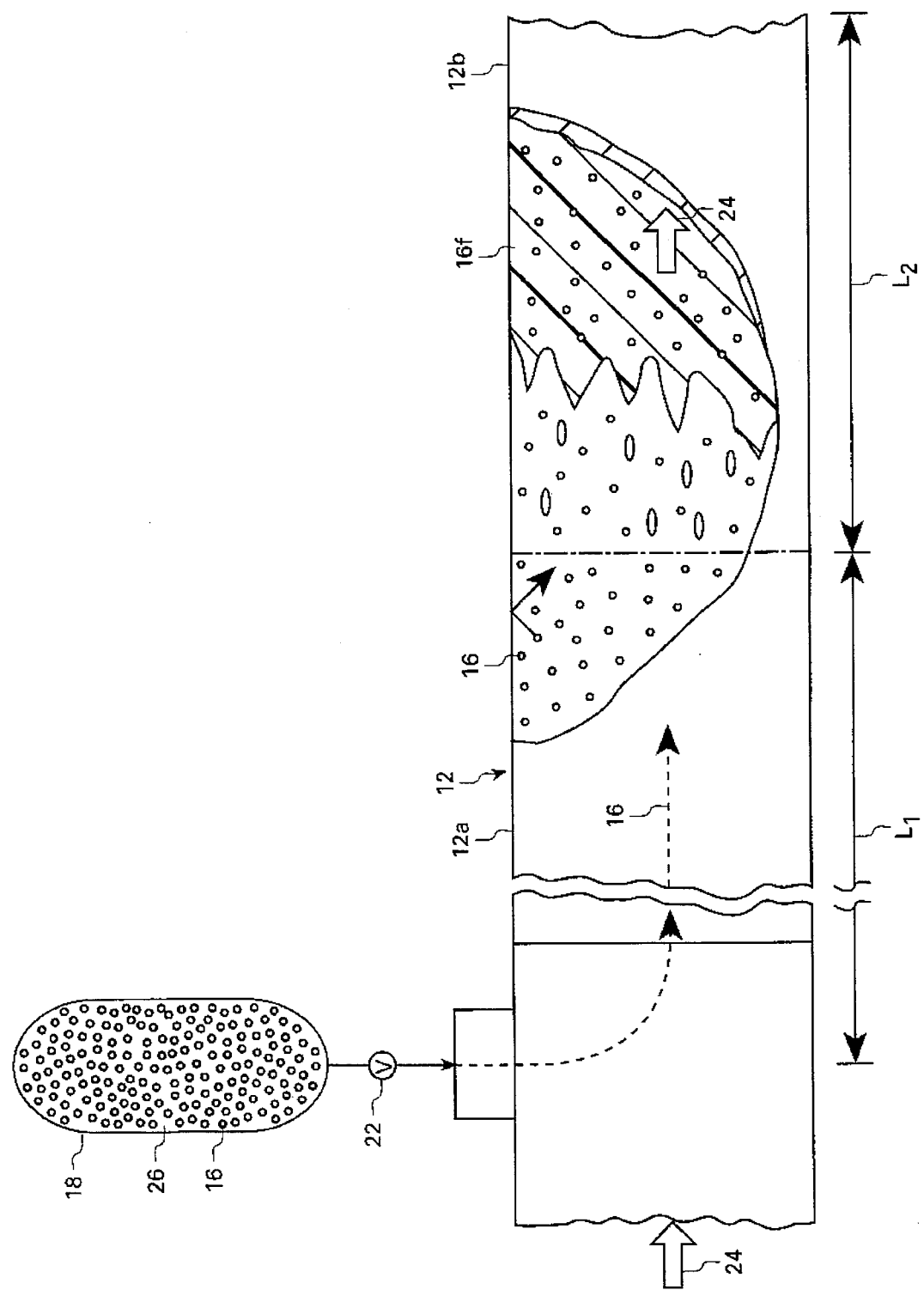
FIG. 2 is an enlarged, partly sectional view of a portion of the system illustrated in FIG. 1.

In the exemplary embodiment illustrated in more particularity in FIG. 2, the container 18 includes a droplet carrier fluid 26 in which the droplets 16 are dispersed, with the carrier fluid 26 and droplets 16 dispersed therein being injectable into the pipe 12 through the droplet valve 22 upon opening thereof. The main fluid 24 flowing through the pipe 12 may be either a liquid or a gas, and for example may be natural gas. The droplet carrier fluid 26 may be any suitable fluid such as an inert gas like nitrogen, or even natural gas to correspond with the exemplary natural gas main fluid 24. The droplets 16 are carried with the main fluid 24 downstream from the injection site and coat or paint the inside surface of the pipe 12 to form a magnetic coating or film 16$f$ thereon. A conventional magnetometer 28 as shown in FIG. 1 is selectively positionable aboveground to locate the pipe 12 by detecting the magnetic marking droplets 16 after they form the film 16$f$ inside the pipe 12.

Figure 3:
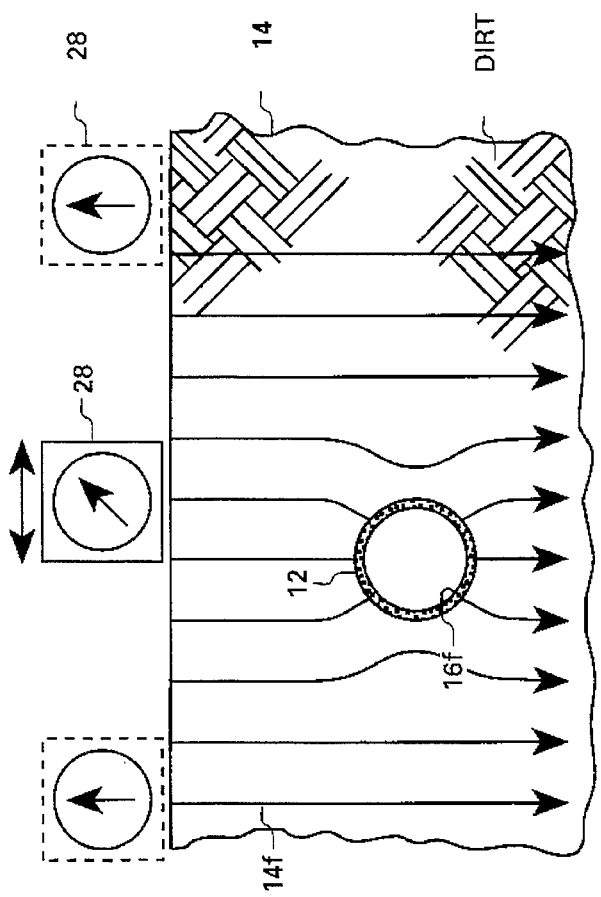
FIG. 3 is a transverse sectional view through the buried pipe illustrated in FIG. 1 and taken along line 3—3.

The magnetic signal from a thin ferromagnetic or permanent magnetic film 16$f$ can be readily detected. For example, a ferromagnetic film 16$f$ of about 0.025 mm thickness deposited inside the pipe 12 having a diameter of about 30 cm will shield the pipe interior from the ambient earth field (of about 0.5 gauss) as shown by the magnetic flux lines 14$f$ illustrated in FIG. 3. The resultant perturbation in the earth's background field will be several percent at a vertical distance of about 3 meters. Such a perturbation can be easily detected using a simple magnetometer 28 as illustrated schematically in FIG. 3. The earth's magnetic flux 14$f$ will be concentrated in the vicinity of the coated pipe 12 which will indicate a different reading of the magnetometer 28 than the readings therefrom laterally remote from the pipe 12. In this way, the magnetometer 28 may be suitably moved aboveground to locate or trace the path of the buried pipe 12.

Figure 4:
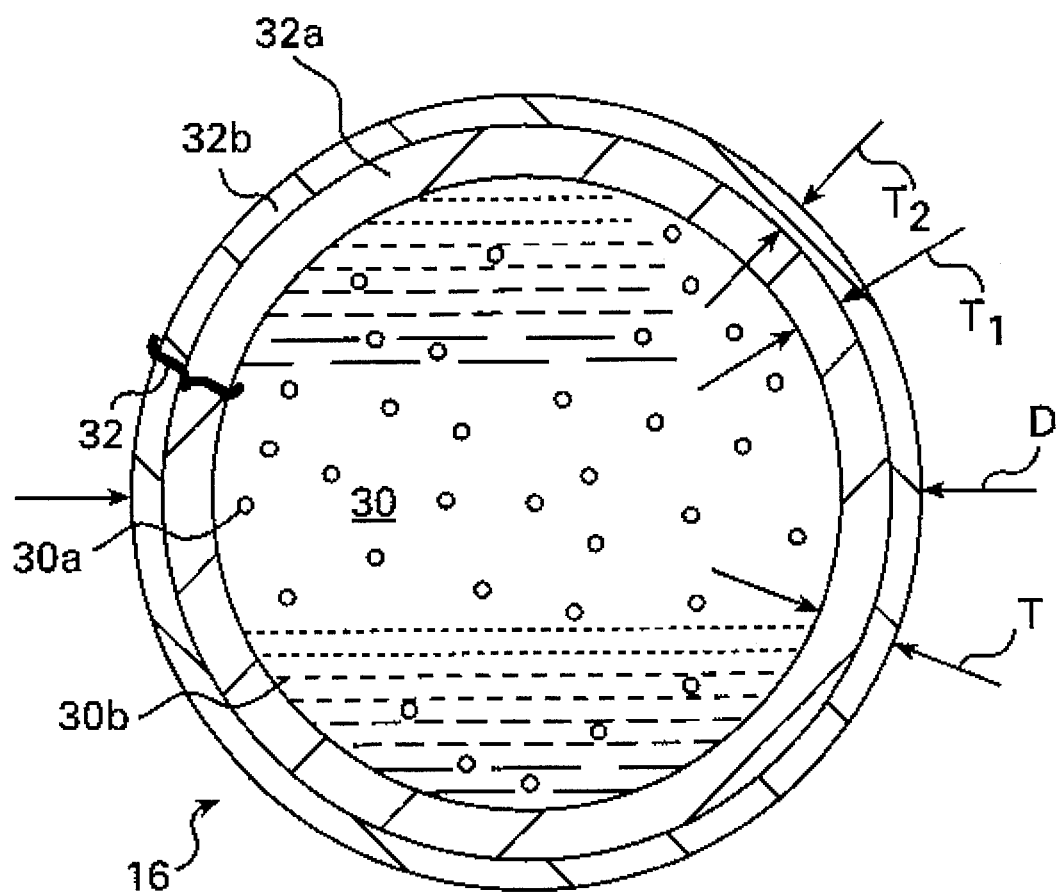
FIG. 4 is a sectional view of an exemplary marking droplet used in the system illustrated in FIGS. 1–3.

The marking droplets 16 may take any suitable form for selectively coating the inside surface of the pipe 12 so that it may be magnetically detected from aboveground. FIG. 4 illustrates an exemplary embodiment of one of the droplets 16 which includes a central core 30 surrounded or encapsulated by a protective cover 32, both of which are spherical in this exemplary embodiment. The core 30 includes magnetically active particles 30a preferably dispersed in a liquid carrier fluid 30b. The particles 30a have adhesive capability for coating or sticking to the inside of the pipe 12 which may be provided by the particle carrier fluid 30b which effectively paints and thereby secures the particles 30a to the inside surface of the pipe 12. In order to control the location of where the particles 30a adhere to the pipe 12 after injection therein, the cover 32 surrounding the core 30 is suitably non-adhesive for preventing sticking or coating of the droplets 16 to the pipe 12, with the cover 32 being removable or ablative for releasing the particles 30a from the core 30 after a predetermined time period within the pipe 12, i.e. in timed-release, for coating the pipe 12 therewith.

The particles 30a may be ferromagnetic such as fine iron or iron oxide particles which are not permanently magnetized, or may be permanently magnetized particles such as fine nickel-cobalt or neodymium-iron particles. The carrier fluid 30b may be conventional oil or water based paint, for example. And, the cover 32 may be formed of a suitable metal, polymer organic, or inorganic material. The particular cover 32 selected depends upon the specific environment in the pipe 12 and the specific mechanism for the removal thereof such as by evaporation or dissolution. The cover 32 of the droplets 16 is preferably substantially solid for containing the core 30 and protecting the core 30 as the droplets 16 flow downstream and bounce off the inner wall of the pipe 12.

As shown in FIG. 4, the cover 32 has an overall thickness T selected for being ablated to release some and preferably all the particles 30a after the desired predetermined time period. In one embodiment, the covers 32 may ablate or disappear by simple evaporation, or by reaction with the main fluid 24 itself to release the cores 30 which can then adhere to the inner surface of the pipe 12. In the case of evaporation, the droplets 16 would initially be maintained at a lower temperature than that of the main fluid 24 until they are injected into the pipe 12 in which they will undergo controlled evaporation. The thickness T of the cover 32 is selected to control the timed-release of the cores 30, and therefore the downstream location of the coating. The covers 32 may have a uniform or common thickness T so that all of the cores 30 are released in a relatively short time period, or the thickness T of the covers 32 may vary as desired to sequentially release the cores 30 over a longer time period and thereby provide a longer length of coating the pipe 12.

More specifically, the covers 32 of the droplets 16 may be tailored to have different rates of ablation or dissolution for controlling the length $L_1$ of an incubation zone 12a as shown in FIG. 1 in which the droplets 16 may flow freely in the pipe 12 without coating thereof. A slow rate of ablation means that it takes longer in time, and therefore longer in distance travelled in the pipe 12, before the covers 32 disappear to release the cores 30. A fast rate of ablation means that it takes shorter in time, and therefore shorter in distance travelled in the pipe 12, before the covers 32 disappear to release the cores 30. The different rates of ablation also control the length $L_2$ of a deposition zone 12b directly following the incubation zone 12a in which the covers 32 finally ablate to release the particles 30a for coating the pipe 12 therewith to form the droplet film 16f as shown in more particularity in FIG. 2. By varying the thicknesses T of the droplet covers 32, different rates of ablation may be effected, with a given batch of droplets 16 having varying cover thicknesses which disappear over a longer length of the pipe 12.

Figure 5:
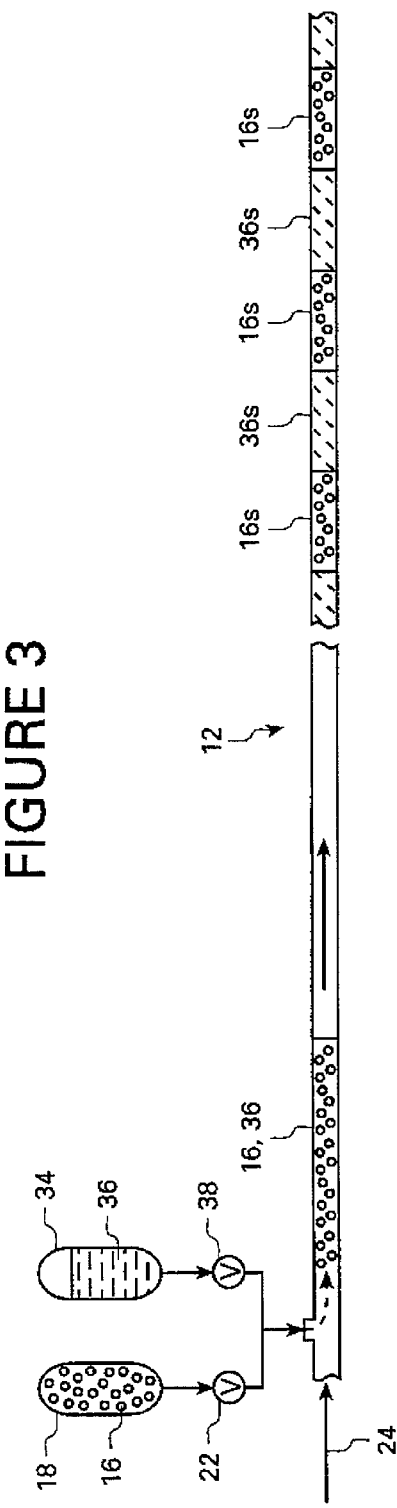
FIG. 5 is a schematic representation of an alternate embodiment of the present invention including a solvent container operatively joined to the pipe.
Figure 6:
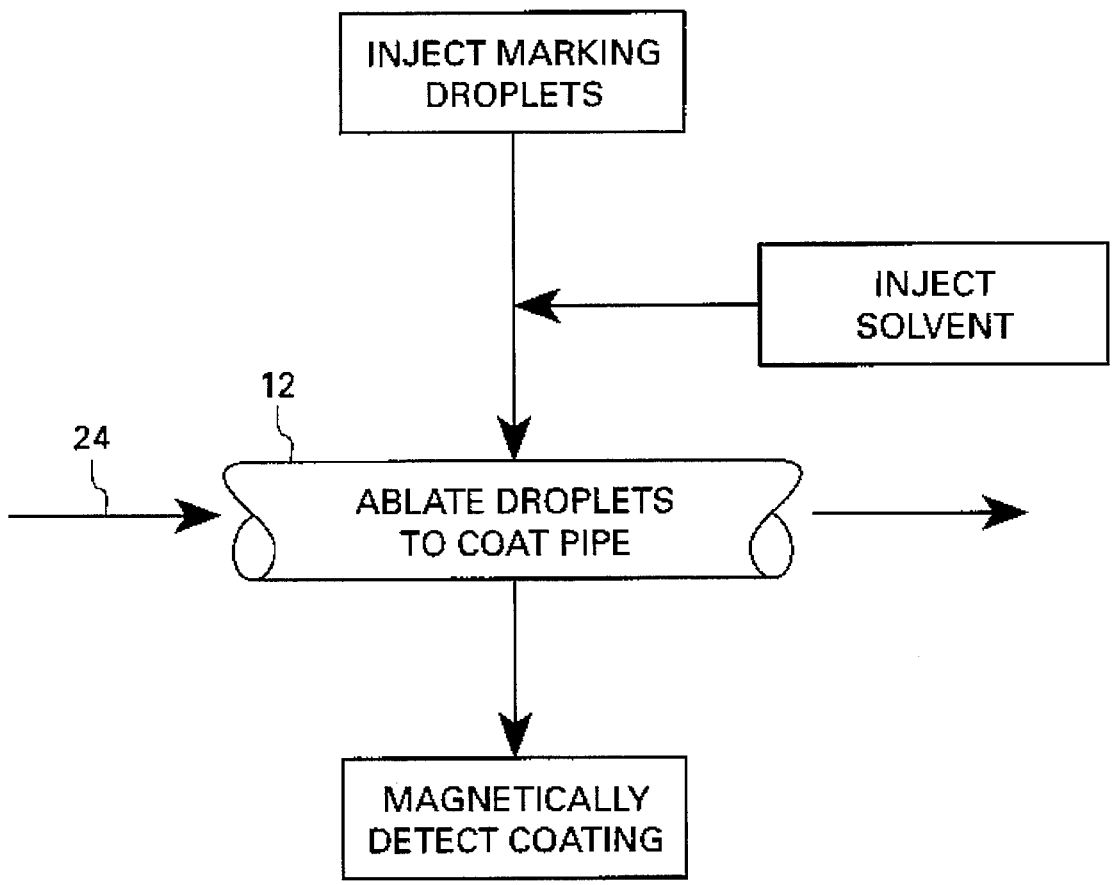
FIG. 6 is a flow chart representation of the basic method of injecting marking droplets into a pipe for the detection thereof.

In accordance with another embodiment of the invention as illustrated schematically in FIG. 5, a second pressurized container 34 includes a suitable solvent fluid 36 and is operatively joined by a second or solvent control valve 38 to the pipe 12 adjacent to the droplet valve 22 at a common injection site. The solvent fluid 36 is effective for dissolving the droplet covers 32, with the droplet and solvent valves 22, 38 being operable for respectively injecting the droplets 16 and the solvent fluid 36 into the pipe 12 either simultaneously for co-injection thereof, or alternately for sequentially injecting slugs 16s and 36s thereof. Mixing of the solvent fluid 36 with the droplets 16 inside the pipe 12 ablates or dissolves the droplet covers 32 to release the droplet cores 30 to coat the pipe 12. The magnetometer 28 illustrated in FIG. 1 is then used to magnetically detect the coated pipe 12 in the basic method shown in the flowchart of FIG. 6.

The solvent fluid 36 and the droplets 16 may be simultaneously co-injected into the pipe 12 and therefore immediately mix with each other as shown schematically directly adjacent to the common injection site in FIG. 5. The dissolution reaction rate between the solvent fluid 36 and the droplet covers 32 depends on the specific composition of the covers 32, their thicknesses, the specific solvent fluid 36, and the concentration of the solvent fluid 36 in the pipe 12. For example, varying the concentration of the solvent fluid 36 in the main fluid 24 relative to the droplets 16 controls the length of the incubation zone 12a (see FIG. 2) in which the droplets 16 may flow freely in the pipe 12 without coating thereof, and therefore controls the location of the deposition zone 12b. Varying the ablation rate of the droplet covers 32, for example by material and/or thickness thereof, controls the length of the deposition zone 12b (see FIG. 2) 12a in which the covers 32 finally ablate to release the cores 30 for coating the pipe 12 therewith. Relatively low solvent concentrations result in long incubation, and deposition far downstream. Relatively high solvent concentrations result in short incubation, and close-in deposition. By using a range of cover thicknesses T in a given batch, the length of the deposition zone 12b can be shortened or lengthened as desired.

The droplet covers 32 may be a single layer, or may include a plurality of different layers or coatings as shown in FIG. 4 which include an inner layer 32a surrounding the core 30, and an outer layer 32b surrounding the inner layer 32a. Multi-layer covers 32 such as the inner and outer layers 32a,b allow different rates of ablation or removal thereof. In one embodiment, the outer layer 32b preferably has a slower rate of ablation than the inner layer 32a for maintaining integrity of the droplets 16 as they flow downstream in the pipe 12. The different rates of ablation may be effected by having different thicknesses for the layers 32a,b. The different rates of ablation may also be effected by having different materials for the layers 32a,b. The inner layer 32a has a first thickness $T_1$, and the outer layer 32b has a second thickness $T_2$, with the outer layer 32b being preferably thinner than the inner layer 32a in one embodiment. The thin outer layer 32b ablates relatively slowly, with the thicker inner layer 32a ablating relatively quicker either by evaporation or by reaction with the solvent fluid 36. This helps maintain droplet integrity as it travels along the pipe 12. When the slowly reacting thin outer layer 32b is gone, the thicker inner layer 32a quickly disappears allowing the droplets 16 to deposit on or coat the inner surface of the pipe 12.

The droplet inner layer 32a may also be a solid that rapidly evaporates in the main fluid 24 after the outer protecting layer 32b is removed. An inner layer 32a having a vapor pressure in the range of about $10^{-2}$ to $10^{-1}$ (0.01–0.1) mm/Hg is exemplary for this purpose. Suitable materials for the inner layer 32a may include one or more of anthalene, anthracene, or their derivatives for example. The inner layer 32a may also comprise naphthalene ($C_{10} H_8$).

The outer layer 32b can be a suitable metal, polymer organic, or inorganic film. One exemplary outer layer 32b includes polymethylmethacrylate film, also known as Lucite, which could be used with gaseous acetone as the solvent fluid 36.

The marking droplet 16 shown in FIG. 4 also has an outer diameter D which may be relatively small on the order of about 20 microns, in which case the droplets 16 may also be referred to as microdroplets 16. In this example, a thickness $T_2$ of the outer layer 32b may be about 1 micron, of polymethylmethacrylate for example, with the thickness $T_1$ of the inner layer 32a being about 3 microns of naphthalene for example. The core 30 may be about 12 microns in diameter and include ferromagnetic iron particles 30a in an oil or water based paint carrier liquid 30b. Gaseous acetone would be used for the solvent fluid 36 for this exemplary microdroplet 16. The amount of droplet material required is modest even for an extensive length of deposition. For example, about 4 liters of the microdroplets 16 should be sufficient to coat a 76 meter section of a 30 cm diameter pipe.

Co-injection of the droplets 16 and solvent fluid 36, and multi-layer droplet coating allows a very wide variety of deposition patterns ranging from close-in/short-to-long deposition to long range/short-to-long deposition. For example, one batch of uniform droplet covers 32 will ablate close together for short deposition lengths. Another batch of varying thickness droplet covers 32 will ablate at different rates and spread the deposition over a longer length. The solvent concentration from adjusting the ratio of the droplet and solvent valves 22,38 controls the length of the incubation zone 12a from close-in to long-range.

As shown at the downstream end of the pipe 12 in FIG. 5, the solvent fluid 36 and the droplets 16 may be alternately or sequentially injected into the pipe 12 to form the respective solvent and droplet slugs 36s, 16s which are mixable together downstream from the injection site. This method is relatively simple and also provides a wide range of deposition patterns in the pipe 12. By varying the respective lengths of the solvent and droplets slugs 36s, 16s, the length of the incubation zone 12a (see FIG. 2) may be controlled. Long slugs take a long time to mix, so that deposition occurs far downstream from the injection site. Conversely, short slugs mix quickly, and therefore deposition occurs relatively close to the injection site. In this way the length of the incubation zone 12a may be readily varied.

In addition to locating the underground pipe 12, the method may also be used for similarly locating branches thereof or leaks or blockages thereof. FIG. 1 also illustrates a blockage site 40 in the pipe 12 which may or may not also allow for leakage of the main fluid 24 into the ground 14 thereat. In either case, the marking droplets 16 may flow to the blockage site 14 and accumulate thereat or in the immediate vicinity of any leakage thereat, with magnetic detection thereof from aboveground revealing the location thereof.

The MAIDUN system 10 described above is simple to build and use. It is effective for controlling both the location and length of the deposition zone. The deposited coating may be relatively uniform with a good magnetic quality which is readily detectable from aboveground. Safe and non-toxic components may be used which do not result in any deterioration of the piping system. And, the cost of operation should be reasonable.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A timed-release marking droplet 16 for coating the inside of an underground pipe 12 for enabling detection of said pipe comprising:

a core 30 of magnetic particles 30a being adhesive for coating said pipe; and a cover 32 surrounding said core 30 and being non-adhesive for preventing sticking to said pipe 12, and also being ablative for releasing said particles 30a from said core 30 after a predetermined time period within said pipe 12 for coating said pipe 12 therewith so that said pipe can be located from above ground by detection of said particles.

2. A droplet according to claim 1 wherein said core 30 includes a carrier 30b containing said particles 30a therein, and said cover 32 is substantially solid for containing said core 30.

3. A droplet according to claim 2 wherein said particles 30a are ferromagnetic.

4. A droplet according to claim 2 wherein said particles 30a are permanently magnetized.

5. A droplet according to claim 2 wherein said cover 32 is selected from one or more in the group including metal, polymer organic, and inorganic.

6. A droplet according to claim 2 wherein said cover 32 has a thickness selected for being ablated to release said particles 30a after said predetermined time period.

7. A droplet according to claim 2 wherein said cover 32 comprises a plurality of different layers including an inner layer 32a surrounding said core 30, and an outer layer 32b surrounding said inner layer 32a.

8. A droplet according to claim 7 wherein said inner and outer layers 32a,b have different rates of ablation.

9. A droplet according to claim 8 wherein said outer layer 32b has a slower rate of ablation than said inner layer 32a.

10. A droplet according to claim 9 wherein said outer layer 32b is thinner than said inner layer 32a.

11. A droplet according to claim 8 wherein said inner layer 32a has a vapor pressure no greater than about 0.1 mm/Hg.

12. A droplet according to claim 11 wherein said inner layer 32a is selected from one or more in the group including anthalene, anthracene, and derivatives thereof.

13. A droplet according to claim 8 wherein said inner layer 32a comprises naphthalene.

14. A droplet according to claim 8 wherein said outer layer 32*b* comprises polymethyl methacrylate.

15. A system 10 for detecting an underground pipe 12 comprising:

a droplet container 18 including a carrier fluid 26 having timed-release magnetic marking droplets 16 dispersed therein, each of said droplets being defined in claim 1 including said core 30 of magnetic particles;

a droplet valve 22 operatively joining said container 18 to said pipe 12 for selectively injecting therein at an injection site said carrier fluid 26 and said marking droplets 16 for selectively coating said pipe 12 with the magnetic particles of said cores 30 of said marking droplets 16 at a downstream site upon said timed-release; and a magnetometer 28 positionable above ground for detecting said magnetic particles of cores 30 of said marking droplets 16 inside said pipe 12 to locate said pipe 12.

16. A system according to claim 15 wherein each of said marking droplets 16 comprises:

a core 30 of magnetic particles 30*a* being adhesive for coating said pipe; and a cover 32 surrounding said core 30 being non-adhesive for preventing sticking to said pipe 12, and also being ablative for releasing said particles 30*a* from said core after a predetermined time period for coating said pipe 12 therewith.

17. A system according to claim 16 further comprising:

a solvent container 34 including a solvent fluid 36 operatively joined by a solvent valve 38 to said pipe 12 adjacent to said droplet valve 22;

said solvent fluid 36 being effective for dissolving said droplet covers 32; and said droplet and solvent valves 22, 38 being operable for respectively injecting said droplets 16 and solvent fluid 36 into said pipe 12 either simultaneously or in alternating slugs 16*s*, 36*s* thereof.

18. A system according to claim 17 wherein said marking droplet covers 32 have different rates of ablation for controlling length of an incubation zone 12*a* in which said droplets 16 may flow in said pipe 12 without coating thereof, and controlling length of a deposition zone 12*b* following said incubation zone 12*a* in which said covers 32 ablate to release said particles 30*a* for coating said pipe 12 therewith.

19. A system according to claim 18 wherein said droplet covers 32 have varying thicknesses to effect said different rates of ablation.

20. A system according to claim 18 wherein said droplet covers 32 have multiple layers of different rates of ablation.

21. A system according to claim 20 wherein said multiple layers 32*a,b* have different thicknesses.

22. A system according to claim 18 wherein said solvent fluid 36 is selected relative to said droplets 16 to effect a solvent concentration to control said incubation and deposition zones 12*a,b*.

23. A method of detecting an underground pipe comprising:

injecting into said pipe 12 timed-release magnetic marking droplets 16 at an injection site, each of said droplets being defined in claim 1 and including a core 30 of magnetic particles to selectively coat said pipe 12 downstream therefrom at a downstream site upon said timed-release; and detecting from above ground said magnetic particles of the cores of said marking droplets 16 coating said pipe 12 for detecting location thereof.

24. A method according to claim 23 wherein said marking droplets 16 are injected into said pipe 12 in a droplet carrier fluid 26 injected therein.

25. A method according to claim 24 wherein said pipe 12 carries a main fluid 24 flowing therethrough, and said marking droplets 16 are injected into said main fluid 24 for flow therewith.

26. A method according to claim 25 wherein said marking droplets 16 include ablatable covers 32 surrounding respective magnetic cores 30, with said covers 32 being non-adhesive to said pipe 12 whereas said magnetic cores 30 are adhesive thereto.

27. A method according to claim 26 wherein said main fluid 24 ablates said droplet covers 32 to timed-release said droplet cores 30 to coat said pipe 12.

28. A method according to claim 26 further comprising injecting a solvent fluid 36 into said pipe 12 for dissolving said droplet covers 32 to release said droplet cores 30 to coat said pipe 12.

29. A method according to claim 28 wherein said solvent fluid 36 and marking droplets 16 are co-injected into said pipe 12.

30. A method according to claim 29 further comprising:

varying concentration of said solvent fluid 36 in said main fluid 24 to control length of an incubation zone 12*a* in which said droplets 16 may flow in said pipe 12 without coating thereof; and varying ablation rate of said droplet covers 32 to control length of a deposition zone 12*b* following said incubation zone 12*a* in which said covers 32 ablate to release said cores 30 for coating said pipe 12 therewith.

31. A method according to claim 28 wherein said solvent fluid 36 and marking droplets 16 are alternately injected into said pipe 12 to form respective solvent and droplet slugs 36*s*, 16*s* which are mixable together downstream therefrom.

32. A method according to claim 31 further comprising varying lengths of said solvent and droplet slugs 36*s*, 16*s*.

* * * * *